(12) United States Patent
Galazin

(10) Patent No.: US 10,293,652 B2
(45) Date of Patent: May 21, 2019

(54) AXLE UNIT

(71) Applicant: SAF-HOLLAND GmbH, Bessenbach (DE)

(72) Inventor: Gregory Galazin, Muskegon, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 49 days.

(21) Appl. No.: 15/510,090

(22) PCT Filed: Sep. 8, 2015

(86) PCT No.: PCT/EP2015/070481
§ 371 (c)(1),
(2) Date: Mar. 9, 2017

(87) PCT Pub. No.: WO2016/038027
PCT Pub. Date: Mar. 17, 2016

(65) Prior Publication Data
US 2017/0259637 A1 Sep. 14, 2017

(30) Foreign Application Priority Data

Sep. 12, 2014 (DE) .......................... 10 2014 218 325

(51) Int. Cl.
*B60G 3/14* (2006.01)
*B60G 9/02* (2006.01)
(Continued)

(52) U.S. Cl.
CPC ............ *B60G 9/025* (2013.01); *B60B 35/007* (2013.01); *B60B 35/02* (2013.01); *B60G 3/145* (2013.01);
(Continued)

(58) Field of Classification Search
CPC ........ B60G 9/025; B60G 3/145; B60G 7/008; B60G 9/003; B60B 2310/302
See application file for complete search history.

(56) References Cited

U.S. PATENT DOCUMENTS 3,482,854 A * 12/1969 Masser .................... B60G 7/02
280/86.75
3,801,086 A * 4/1974 Raidel .................... B60G 9/003
267/67
(Continued)

FOREIGN PATENT DOCUMENTS

CN 1726139 B 5/2010
DE 69811741 10/2003
(Continued)

OTHER PUBLICATIONS

European Patent Office; International Search Report, dated Nov. 10, 2015.

*Primary Examiner* — Nicole T Verley
(74) *Attorney, Agent, or Firm* — Price Heneveld LLP

(57) ABSTRACT

An axle unit includes an axle tube and a suspension arm element, wherein the axle tube extends substantially along a tube axis, wherein the suspension arm element has a first joining region comprising a recess, wherein the first joining region of the suspension arm element is adjacent to the axle tube, wherein the suspension arm element is substantially transverse to the tube axis, and wherein a weld portion between the suspension arm element and the axle tube is located in the first joining region.

18 Claims, 2 Drawing Sheets

(51) Int. Cl.
    *B60G 7/00*   (2006.01)
    *B60G 9/00*   (2006.01)
    *B60B 35/00*  (2006.01)
    *B60B 35/02*  (2006.01)

(52) U.S. Cl.
    CPC ............ *B60G 7/001* (2013.01); *B60G 7/008* (2013.01); *B60G 9/003* (2013.01); *B60B 2310/302* (2013.01); *B60B 2900/711* (2013.01); *B60G 2200/31* (2013.01); *B60G 2204/148* (2013.01); *B60G 2206/10* (2013.01); *B60G 2206/31* (2013.01); *B60G 2206/8201* (2013.01); *B60Y 2200/142* (2013.01)

(56) References Cited

U.S. PATENT DOCUMENTS

| | | | | |
|---|---|---|---|---|
| 4,615,539 A * | 10/1986 | Pierce | ............ | B60G 9/003 |
| | | | | 180/905 |
| 5,112,078 A * | 5/1992 | Galazin | ............ | B60G 7/02 |
| | | | | 280/124.116 |
| 5,366,237 A * | 11/1994 | Dilling | ............ | B60G 7/001 |
| | | | | 280/124.116 |
| 6,508,393 B2 * | 1/2003 | Chalin | ............ | B60G 7/001 |
| | | | | 228/136 |
| 6,508,482 B2 * | 1/2003 | Pierce | ............ | B60G 7/001 |
| | | | | 280/124.116 |
| 6,827,360 B2 * | 12/2004 | Chan | ............ | B60G 7/001 |
| | | | | 280/124.116 |
| 6,843,490 B2 * | 1/2005 | Raidel, II | ............ | B60G 7/02 |
| | | | | 280/124.116 |
| 7,048,288 B2 * | 5/2006 | Chan | ............ | B60G 7/001 |
| | | | | 280/124.11 |
| 7,347,435 B2 * | 3/2008 | Chalin | ............ | B60G 7/001 |
| | | | | 280/124.11 |
| 7,484,744 B2 * | 2/2009 | Galazin | ............ | B60G 9/003 |
| | | | | 280/124.116 |
| 7,607,670 B2 * | 10/2009 | Raidel, II | ............ | B60G 9/003 |
| | | | | 280/124.11 |
| 7,669,866 B2 * | 3/2010 | Peaker | ............ | B60G 7/001 |
| | | | | 280/124.108 |
| 7,726,673 B2 * | 6/2010 | Saieg | ............ | B60G 7/001 |
| | | | | 280/124.116 |
| 7,740,255 B2 * | 6/2010 | Holt | ............ | B60G 7/001 |
| | | | | 280/124.11 |
| 8,002,297 B2 * | 8/2011 | Keiserman | ............ | B60G 9/02 |
| | | | | 280/124.116 |
| 8,770,604 B2 * | 7/2014 | Brereton | ............ | B60G 7/001 |
| | | | | 280/124.108 |
| 8,910,961 B2 * | 12/2014 | Galazin | ............ | B60G 9/003 |
| | | | | 280/124.128 |
| 9,630,466 B2 * | 4/2017 | Galazin | ............ | B60G 9/003 |
| 9,718,321 B2 * | 8/2017 | Schewerda | ............ | B60G 7/001 |
| 2005/0051986 A1 * | 3/2005 | Galazin | ............ | B60G 7/001 |
| | | | | 280/124.116 |
| 2006/0033304 A1 | 2/2006 | Saieg et al. | | |
| 2006/0181047 A1 * | 8/2006 | Chamberlin | ............ | B60G 7/001 |
| | | | | 280/124.128 |
| 2008/0029988 A1 | 2/2008 | Saieg et al. | | |
| 2009/0072505 A1 * | 3/2009 | McGinnis | ............ | B60G 9/003 |
| | | | | 280/124.116 |
| 2012/0067482 A1 | 3/2012 | Stech | | |
| 2012/0212039 A1 | 8/2012 | Sonzala et al. | | |
| 2015/0047764 A1 | 2/2015 | Tiziani et al. | | |
| 2016/0075202 A1 * | 3/2016 | Galazin | ............ | B60G 9/003 |
| | | | | 280/124.125 |
| 2017/0259638 A1 * | 9/2017 | Jansen | ............ | B60G 9/025 |

FOREIGN PATENT DOCUMENTS

| | | |
|---|---|---|
| DE | 30201750 | 12/2005 |
| DE | 102011086481 | 5/2013 |
| DE | 102014001373 | 8/2015 |
| GB | 2396140 | 6/2004 |
| WO | 0001548 | 1/2000 |
| WO | 03064192 | 8/2003 |
| WO | 2008115861 | 9/2008 |
| WO | 2009035520 | 9/2008 |
| WO | 2012015669 | 2/2012 |
| WO | 2012084912 | 6/2012 |
| WO | 2013025991 | 2/2013 |

* cited by examiner

AXLE UNIT

BACKGROUND OF THE INVENTION

The present invention concerns an axle unit, in particular for use in trucks.

Axle units are known from the prior art insofar as an axle tube, which is often a rigid axle, is mounted on or secured to the frame of the truck so as to be sprung or damped via a suspension arm arrangement, wherein one or a plurality of vehicle wheels is mounted rotatably on the axle tube. The connecting region between the axle tube and the longitudinal suspension arm here is a portion of the truck's chassis suspension which is particularly heavily loaded, and in particular subject to periodic load changes. In the past, many attempts have been made to adapt the connecting region between the longitudinal suspension arm and the axle tube to these high loads. Many axle units are known from the prior art which have had to be over-dimensioned and hence have a very high weight of the axle unit, as a consequence of the design with greater safety against fatigue breakage or similar damage to the connecting region between the axle unit and suspension arm unit. There is therefore a need for improvement in the area of the connection between the longitudinal suspension arm and the axle tube of a truck wheel suspension, in order in particular to reduce the weight of the axle unit and at the same time achieve sufficient strength values and allow simple production.

The object of the present invention is to provide an axle unit which can be produced easily while having particularly high strength values of the connecting region between an axle tube and a suspension arm element, while also having a low component weight.

SUMMARY OF THE INVENTION

According to the invention, the axle unit comprises an axle tube and a suspension arm element, wherein the axle tube extends substantially along a tube axis, wherein the suspension arm element has a first joining region configured as a recess, wherein the suspension arm element is arranged with its first joining region adjacent to the axle tube and substantially transverse to the tube axis, wherein a weld portion between the suspension arm element and the axle tube can be produced in the first joining region. The axle tube is preferably the rigid axle of a truck, at the distal ends of which the wheels of the truck are mounted rotatably. The suspension arm element is preferably the longitudinal suspension arm of a truck, or part of such a longitudinal suspension arm, wherein the suspension arm element is preferably mounted at a first end pivotably on the frame of the truck. Preferably, at its end opposite the first end, the suspension arm element is connected to the axle tube. For connection to the axle tube, the suspension arm element has a joining region configured as a recess. The recess in the present case is preferably an opening in the suspension arm element, along the inner edge of which a weld seam between the suspension arm element and the axle tube can be produced. In other words, the joining region is configured as an "eye". Due to the preferred fixing of the suspension arm element to the axle tube in the region of the first joining region, in particular preferably the material stresses in the region of the connection between the suspension arm element and the axle tube can be minimized, since the first joining region configured as a recess allows a particularly good transmission of forces and moments between the axle tube and the suspension arm element. The weld seam which can be produced in the joining region is preferably a weld seam which is composed partly of the material of the axle tube, partly of the material of the suspension arm element, and partly of an additional welding material added during the welding process. The weld portion is therefore preferably the material region between the axle tube and the suspension arm element, via which forces and moments are transmitted between the axle tube and the suspension arm element.

Preferably, the axle tube and the suspension arm element are secured to each other exclusively in the first joining region. This means, in other words, that preferably no substance bonding and/or force-fit and/or form-fit connections are provided between the axle tube and the suspension arm element outside the first joining region. The advantage of this embodiment is that production of the axle unit is particularly simple, since a weld connection between the axle tube and the suspension arm element need be produced only in the first joining region and meets all requirements for strength of the connection between the axle tube and the suspension arm element.

Particularly preferably, the axle tube has a pressure half and a tension half, wherein the weld portion is provided exclusively in the pressure half of the axle tube. The pressure half of the axle tube is preferably the region of the axle tube which, in operation of the axle unit, is mainly loaded with compression stress under a bending load. In particular, it is preferred if the pressure half of the axle tube is the half which is situated substantially on the top side of the axle tube in relation to the spatial arrangement of the axle tube in its state fitted on the axle unit. The tension half of the axle tube is preferably the half of the axle tube opposite the pressure half. In the tension half, the axle tube is preferably mainly loaded with tensile stress. In the context of the present invention, it has proved advantageous to arrange the weld connection between the suspension arm element and the axle tube on the pressure half of the axle tube. In this way, the service life of the connection between the suspension arm element and the axle tube can be significantly increased, since the axle unit in the region of the weld connection between the suspension arm element and the axle tube is loaded substantially exclusively with compression stress. The forces deforming the axle tube, which lead to a pressure and a tension half on the axle tube, are preferably the support force of the truck wheels acting on the outside or the distal end of the axle tube, and the weight force of the truck transmitted through the suspension arm element to the axle tube. Preferably, the pressure half of the axle tube is arranged on the side of the axle tube directed against gravity. Particularly preferably, the weld portion is arranged substantially in the half of the pressure half of the axle tube facing towards the pivot axis of the suspension arm element. Preferably, the weld portion is arranged on the suspension arm element with at least 80% of its extension, and particularly preferably completely in the half of the axle tube pointing towards the pivot axis. In this way, by welding in the pressure half, the high fatigue strength of the connection between the axle tube and suspension arm element may be combined with ease of assembly of the axle unit. In particular, by arrangement of the weld portion on the side facing the pivot axis, the region of the suspension arm element remains free on which further elements of the axle unit, such as a carrier element, may be secured.

Particularly preferably, no weld connection between the axle tube and the suspension arm element is provided in the tension half of the axle tube. Preferably, the axle unit is provided with a weld connection between the axle tube and suspension arm element only in the pressure half of the axle tube. This prevents material damage from local crack formation, because of tensile stress, occurring in the region of the weld connection between the axle tube and suspension arm element, or in the region of the weld portion, and consequently shortening the service life of the connection between the suspension arm element and axle tube. Advantageously, the weld portion of the suspension arm element is dimensioned and arranged such that it does not protrude into the traction half of the axle tube.

In a particularly preferred embodiment, the weld portion extends maximally over a weld arc angle relative to the tube axis, wherein the weld arc angle is less than 120°, preferably less than 100°, and particularly preferably less than 90°. The weld arc angle is preferably the angle between a point on the tube axis and two straight lines which each extend from the tube axis to a respective end of the weld portion in a section plane running perpendicular to the tube axis. The section plane runs preferably through the region of the weld portion in which this spans a maximum arc angle. The weld portion is preferably configured elliptically. In alternative embodiments, the weld portion may also be configured substantially rectangular, wherein preferably rounded edges of the rectangle are provided. In the context of the present invention, it has been found that an adequate strength of the connection between the suspension arm element and the axle tube can always be achieved with a weld arc angle of less than 120°. In order to achieve an adequate length of the weld seam in the weld portion, the weld portion may have a greater extension along or parallel to the tube axis than parallel to a circumference or to an orbit around the tube axis. In the preferred case that the weld arc angle is less than 100°, particularly preferably an optimum arrangement of the weld portion in the pressure half of the axle tube is possible. A weld arc angle of less than 90° has the advantage that the region in which the axle tube is weakened by the production of a weld connection is as small as possible, but nonetheless an adequate strength can be achieved by a sufficient length of the weld seam of the first weld portion.

Particularly preferably, the suspension arm element surrounds the axle tube with a suspension arm arc angle relative to the tube axis, wherein the suspension arm arc angle is less than 180°. In other words, the suspension arm arc angle is the angle with which the suspension arm element surrounds the axle tube with a receiving region, preferably comprising the joining region and regions adjacent thereto. Here, the suspension arm element is preferably not welded to the axle tube in the entire region of enclosure of the axle tube. Preferably, therefore, the weld arc angle is smaller than the suspension arm arc angle. In the preferred case that the suspension arm arc angle is less than 180°, or is precisely 180°, the axle tube may be inserted laterally, in other words transversely to the tube axis, into the receiving region which also surrounds the joining region. In this way, advantageously further attachment systems may be secured to the axle tube before the connection to the suspension arm element is created, wherein the axle tube need not be pushed through the receiving region.

Advantageously, the suspension arm arc angle is 1.05 to 2.5 times, preferably 1.2 to 2 times, and particularly preferably 1.6 to 1.8 times the weld arc angle. The size ratio between the suspension arm arc angle and the weld arc angle expresses the order of magnitude by which the suspension arm element encases the axle tube outside the weld connection in the weld portion. The regions outside the first weld portion serve in particular, preferably, for transmission of the weight force of the truck to the axle tube. In the context of the present invention, it is particularly preferred that the suspension arm element is not welded to the axle tube in the entire region of force transmission, but the weld connection is produced only in a specific portion of the contact region between the suspension arm element and the axle tube. In this way, material damage and material weakness in the contact region between the axle tube and suspension arm element can be minimized. In the context of the present invention therefore, it is preferred that the ratio of the suspension arm arc angle to the weld arc angle does not fall below a value of 1.05. The upper limit of the value range of 2.5 is preferably used for suspension systems in which substantially the pressure forces are expected to act on the connection between the suspension arm element and the axle tube, wherein the pressure forces may also be transmitted outside the weld portion. The particularly preferred range of 1.6 to 1.8 has proved suitable in particular for heavily loaded trucks, wherein an optimum compromise is found between the possibility of high maximum forces and bending moments to be transmitted, and an adequate service life of the connection between the axle tube and the suspension arm element because of the comparatively low material weakness due to the production of a weld connection.

Preferably, the first joining region is suitably configured as a peripherally closed recess on the suspension arm element, wherein the weld portion has a peripheral face at the first joining region. In other words, the first joining region is therefore preferably configured as a recess through which the contact region between the suspension arm element and axle tube is accessible, so that a weld seam may be produced in the first weld portion. The weld portion here preferably has a peripheral face. The peripheral face is preferably defined as the inwardly directed face of the joining region configured as a recess. Particularly preferably, the peripheral face is configured annular and curved, wherein the curvature runs transversely to the annular track.

Particularly preferably, the peripheral face has a medium length which stands in a ratio from 0.4 to 1.3, preferably 0.6 to 1, and particularly preferably approximately 0.85 to 0.95 to the circumference of the axle tube in the region of the first joining region. Variation of the medium length of the peripheral face of the weld portion is a possibility for influencing the actual connecting length, i.e. in other words, the length along which a weld seam is produced between the axle tube and the suspension arm element. The medium length in this context is defined as the extension of the peripheral face measured in the middle between the axle tube and the suspension arm element. It has been found that, within the limits of a ratio from 0.4 to 1.3, a favorable compromise can be achieved between a remaining residual wall thickness of the suspension arm unit outside the weld portion, and on the other hand a sufficiently large connecting length or weld seam length between the suspension arm element and axle tube. The preferred ratio from 0.6 to 1 here allows, with a preferred slightly elliptical configuration of the weld portion, a medium length of the peripheral face to be achieved which is substantially greater than or equal to the circumference of the axle tube, whereby in the design of the axle unit, preferably merely a scaling need be performed and always the correspondingly advantageous ratio may be selected between the edge length of the weld portion and the thickness or circumference of the axle tube.

Further preferably, the first joining region is provided on the suspension arm element so that two suspension arm webs are formed adjacent to the first joining region and substantially opposite each other, wherein the suspension arm webs preferably each have a minimum web width, wherein the first joining region preferably has a maximum cutout extension parallel to the tube axis, wherein preferably the sum of the minimum web widths to the cutout extension stands in a ratio from 0.1 to 1, preferably 0.2 to 0.8, and particularly preferably approximately 0.3 to 0.5. The web regions adjacent to the joining region preferably have a greater extension transversely to the suspension arm axis, or to the tube axis, than their web width. In this way, the suspension arm webs form a preferred material reinforcement of the suspension arm element in the area of the joining region, which compensates for the material weakness caused by the recess of the joining region. In order to achieve a good compromise between adequate material thickness of the suspension arm element and at the same time a sufficient edge length along which the joining region can be secured to the axle tube, it is preferred for the cutout extension to stand in a specific ratio to the extension of the web width. Preferably, the control arm webs have a web width, the minimum value of which is smaller than the extension of the weld portion along or parallel to the suspension arm axis or tube axis. The minimum web width is preferably the smallest amount of the material thickness of the suspension arm element in the region of the recess of the first joining region. Preferably, the minimum web width is measured between the outside of the suspension arm element and the edge of the recess. Therefore in the region of the minimum web width, the suspension arm element has a material weakness, the negative effect of which on the strength of the suspension arm element can be kept low if the ratio of the sum of the minimum web widths to the recess extension does not fall below a value of 0.1. The preferred ratio range of 0.1 to 1 of the sum of the minimum web widths to the cutout extension ensures a particularly good compromise between an adequate edge length for welding the suspension arm element to the axle tube and an adequate strength of the suspension arm element against deformation. In this way, a particularly good compromise can be achieved between the strength of the weld connection between the suspension arm element and the axle tube, and the strength of the suspension arm element itself. The particularly preferred range of 0.2 to 0.8 has proved suitable in particular for axle systems in which a particularly compact structure of the connection between the suspension arm element and the axle tube is required. The particularly preferred ratio range of 0.3 to 0.4, according to experiments by the applicant, achieved the best values for firstly the strength of the suspension arm element and secondly the strength of the weld connection between the suspension arm element and the axle tube.

In a particularly preferred embodiment, the suspension arm element is formed as an integral casting. By producing the suspension arm element in a casting process, in particular the manufacturing duration and number of process steps necessary for production may be reduced. In addition, casting achieves a particularly even material structure of the suspension arm element, which achieves particularly high strength values.

Particularly preferably, a carrier element is provided for securing a spring element to the axle unit, wherein the carrier element may be secured, preferably is secured, to the axle tube via a second joining region, and wherein the second joining region is preferably configured as a recess on the carrier element. Particularly preferably, the second joining region, like the first joining region, is configured as a recess, whereby a peripheral weld seam between the carrier element and the axle tube can be produced easily. Particularly preferably, the carrier element may also have a joining region at which a substance bonding connection to the suspension arm element can be produced.

Particularly preferably, the carrier unit is secured to the axle tube exclusively in the second joining region. In order to keep the material weakening on the axle tube as low as possible, it is preferred to restrict the fixing region, or in other words the welding zone, between the carrier element and the axle tube, to the second joining region. Particularly preferably, the suspension arm element and carrier element are thus each secured to the axle tube via a joining region configured as a recess. To support the strength of the axle unit, in addition a further weld connection between the carrier element and the suspension arm element may be produced.

Further advantages and preferred features of the present invention arise from the description below with reference to the attached drawings. The individual features shown in selected figures may also be used in embodiments of other figures unless this is explicitly excluded or prohibited for technical reasons.

DETAILED DESCRIPTION OF THE PREFERRED EMBODIMENTS

Figure 1:
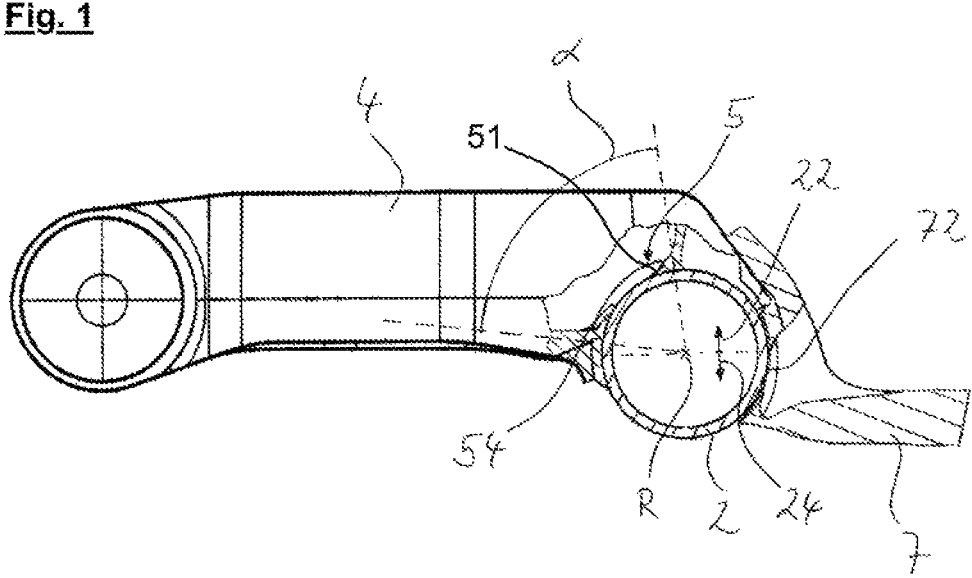
FIG. 1 shows a partially cutaway, side view of a preferred embodiment of the axle unit according to the invention.

FIG. 1 shows a partially cutaway, side view of a preferred embodiment of the axle unit according to the invention. In particular, the first joining region 5, the axle tube 2 and the carrier element 7 (preferably provided) are shown cut away. Via the first joining region 5, the suspension arm element 4 is secured to the axle tube 2 by means of a weld connection. The weld portion 54 provided in the first joining region 5 extends preferably with a weld arc angle $\alpha$ relative to the tube axis R. Furthermore, preferably, the weld portion 54 extends only in the pressure half 22 of the axle tube 2, while no weld connection between the suspension arm element 4 and the axle tube 2 exists in the tension half 24 of the axle tube 2. The carrier element 7 preferably has a second joining region 72 in which it is secured to the axle tube 2.

Figure 2:
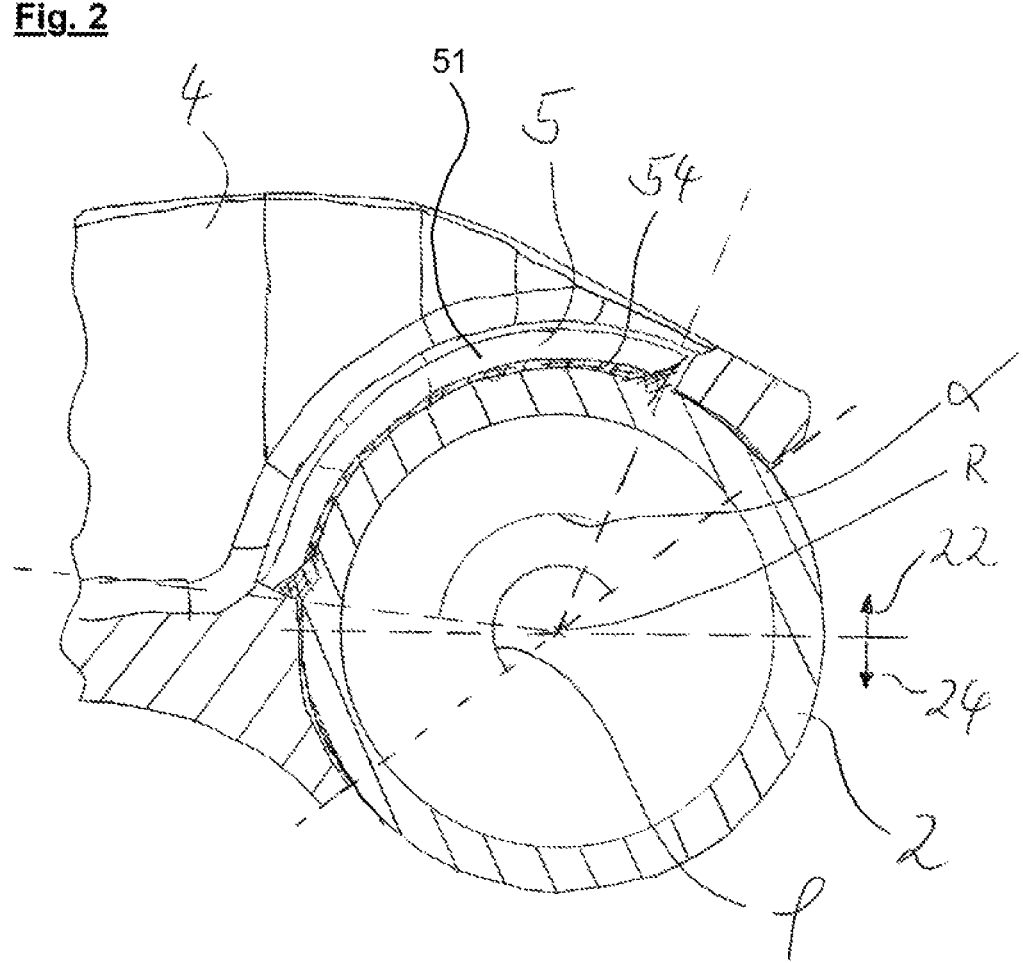
FIG. 2 shows a detail view of an embodiment according to the invention of the axle unit according to the invention.

FIG. 2 shows a detail view of the first joining region 5 already shown in FIG. 1, wherein the weld portion 54 preferably extends over a weld arc angle $\alpha$ relative to the tube axis R. Preferably, the suspension arm element 4 surrounds the axle tube 2 with a suspension arm arc angle $\phi$ which is preferably less than 180°. Furthermore, preferably, the suspension arm arc angle $\phi$ is significantly larger than the weld arc angle $\alpha$. Because the suspension arm element 4 surrounds the axle tube 2 with a suspension arm arc angle $\phi$ which is significantly greater than the weld arc angle $\alpha$, preferably a very large force transmission face is available for transmission of weight and retaining forces to the axle tube 2. Furthermore, due to the preferred restriction of the expansion of the weld seam or weld portion 54 to the pressure half 22 of the axle tube 2, the occurrence of tensile stresses in the region of the weld connection between the suspension arm element 4 and the axle tube 2 is avoided, whereby the service life may be extended significantly. Preferably, the weld arc angle α has an angle of around 105°.

Figure 3:
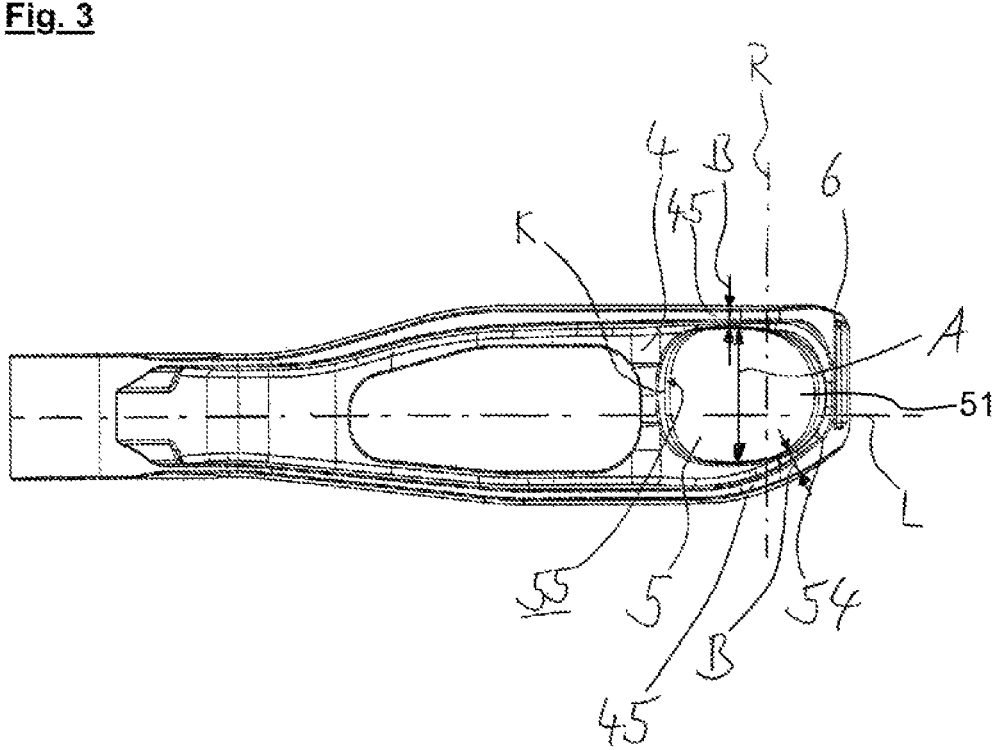
FIG. 3 shows a top view of a preferred embodiment of the axle unit according to the invention.

FIG. 3 shows a top view of a preferred embodiment of the suspension arm element 4 according to the invention. This illustrates the preferred, substantially oval geometry, preferably deviating from the circular form at least in regions, of the first joining region 5. Preferably, the region of the pivotable suspension of the suspension arm element 4 on the frame of a truck is provided on the left side of the suspension arm element 4. In this region, the suspension arm element 4 extends preferably planar symmetrically to a suspension arm center axis L. It is furthermore shown that a retaining portion 6 is arranged eccentrically to the suspension arm center plane, to simplify mounting of the carrier element 7 (not shown, see FIG. 1). Furthermore, FIG. 3 shows the weld portion 54 of the suspension arm element 4 which is preferably configured as a recess 51, and along the inner face of which a weld connection may be produced to the axle tube 2 (not shown). The peripheral face 55 of the weld portion 54 preferably has a medium length K which stands in a ratio to the circumference of the axle tube. Furthermore, FIG. 3 shows a preferred feature of the axle unit, in which the suspension arm element 4 has a first suspension arm web 45 and a second suspension arm web 45 in the joining portion 5. The suspension arm webs 45 have a minimum web width B, wherein parallel to the tube axis R, the weld portion 54 has a cutout extension A which stands in a specific ratio to the sum of the web widths B. The web width B is preferably measured in the top view of the suspension arm element 4 shown in FIG. 3. Preferably, the web widths B are smaller than the cutout extension A. In the present example, the sum of the two web widths B is approximately 0.3 to 0.5 times the cutout extension A.

LIST OF REFERENCE NUMERALS

2 Axle tube
4 Suspension arm element
45 Suspension arm web
5 First joining region
54 Weld portion
55 Peripheral face
6 Retaining portion
7 Carrier element
72 Second joining region
11 Recess
A Cutout extension
B Web width
K Central length
L Suspension arm center axis
R Tube axis
α Weld arc angle
φ Suspension arm arc angle

The invention claimed is:
1. An axle unit, comprising:
an axle tube; and
a suspension arm element;
wherein the axle tube extends substantially along a tube axis;
wherein the suspension arm element includes a first joining region comprising a recess;
wherein the first joining region of the suspension arm element is adjacent to the axle tube, and wherein the suspension arm element is substantially transverse to the tube axis;
wherein a weld portion between the suspension arm element and the axle tube is located in the first joining region;
wherein the suspension arm element surrounds the axle tube with a suspension arm arc angle relative to the tube axis;
wherein the suspension arm arc angle is less than 180°;
wherein the axle tube and the suspension arm element are secured to each other exclusively in the first joining region;
wherein the axle tube includes a pressure half and a tension half; and
wherein the weld portion is located exclusively in the pressure half of the axle tube.
2. The axle unit as claimed in claim 1, wherein no weld connection between the axle tube and the suspension arm element exists in the tension half of the axle tube.
3. The axle unit as claimed in claim 1, wherein the weld portion extends maximally over a weld arc angle relative to the tube axis, wherein the weld arc angle is less than 120°.
4. The axle unit as claimed in claim 3, wherein the weld arc angle is less than 100°.
5. The axle unit as claimed in claim 4, wherein the weld arc angle is less than 90°.
6. The axle unit as claimed in claim 3, wherein the suspension arm arc angle is within the range 1.05 to 2.5 times the arc weld angle.
7. The axle unit as claimed in claim 6, wherein the suspension arm angle is within the range of 1.2 to 2 times the weld arc angle.
8. The axle unit as claimed in claim 7, wherein the suspension arm angle is within the range of 1.6 to 1.8 times the weld arc angle.
9. The axle unit as claimed in claim 1, wherein the first joining region comprises a recess on the suspension arm element, and wherein the weld portion includes a peripheral face on the first joining region.
10. The axle unit as claimed in claim 9, wherein the peripheral face has a medium length and wherein a ratio of the medium length to a circumference of the axle tube in a region of the first joining region is from 0.4 to 1.3.
11. The axle unit as claimed in claim 10, wherein the ratio of the medium length to the circumference of the axle tube is from 0.6 to 0.1.
12. The axle unit as claimed in claim 11, wherein the ratio of the medium length to the circumference of the axle tube is from 0.85 to 0.95.
13. The axle unit as claimed in claim 1, wherein the suspension arm element adjacent to the joining region includes two suspension arm webs substantially opposite each other, wherein the suspension arm webs each have a minimum web width, wherein the first joining region has a maximum cutout extension parallel to the tube axis, and wherein a ratio of the sum of the minimum web widths to the maximum cutout extension is from 0.1 to 1.
14. The axle unit as claimed in claim 13, wherein the ratio of the sum of the minimum web widths of the maximum cutout extension is from 0.2 to 0.8.
15. The axle unit as claimed in claim 14, wherein the ratio of the sum of the minimum web widths of the maximum cutout extension is from 0.3 to 0.5.
16. The axle unit as claimed in claim 1, wherein the suspension arm element is a single-piece, integral casting.
17. The axle unit as claimed in claim 1, further comprising:
a carrier element configured to secure a spring element to the axle unit, wherein the carrier element is configured to be secured to the axle tube via a second joining region, and wherein the second joining region comprises a recess on the carrier element.

18. The axle unit as claimed in claim 17, wherein the carrier unit is secured to the axle tube exclusively in the second joining region.

* * * * *